US005250788A

United States Patent [19]

Sugai et al.

[11] Patent Number: 5,250,788

[45] Date of Patent: Oct. 5, 1993

[54] APPARTUS FOR HANDLING SHEETS OF PAPER USING ROBOT HANDS

[75] Inventors: Kazunari Sugai, Niigata; Kenji Taguchi, Shibata, both of Japan

[73] Assignee: Hitachi, Ltd., Tokyo, Japan

[21] Appl. No.: 572,620

[22] Filed: Aug. 27, 1990

[30] Foreign Application Priority Data

Aug. 31, 1989 [JP] Japan .................................. 1-223154

[51] Int. Cl.$^5$ .............................................. G06F 15/30

[52] U.S. Cl. .................................... 235/379; 414/332; 902/12; 902/15; 902/32

[58] Field of Search ................ 235/380, 379; 414/331, 414/332, 334; 902/8, 12, 15, 17, 32

[56] References Cited

U.S. PATENT DOCUMENTS

| | | | |
|---|---|---|---|
| 4,282,424 | 8/1981 | Hirose | 902/32 |
| 4,620,087 | 10/1986 | Aizaki | 235/379 |
| 4,775,783 | 10/1988 | Sasaki et al. | 235/379 |
| 4,820,909 | 4/1989 | Kawauchi et al. | 235/379 |
| 4,866,254 | 9/1989 | Okayama et al. | 2235/379 |
| 4,884,698 | 12/1989 | Tutamune et al. | 235/379 |
| 4,988,849 | 1/1991 | Sasaki et al. | 902/10 |
| 5,019,249 | 5/1991 | Sugai et al. | 235/379 |
| 5,105,069 | 4/1992 | Hakenewerth et al. | 235/379 |
| 5,128,912 | 7/1992 | Hug et al. | 369/38 |

FOREIGN PATENT DOCUMENTS

| | | |
|---|---|---|
| 5927385 | 8/1982 | Japan . |
| 59119497 | 12/1982 | Japan . |
| 59-208685 | 5/1983 | Japan . |
| 59-197990 | 4/1984 | Japan . |
| 60-224144 | 11/1985 | Japan . |
| 63-188289 | 1/1987 | Japan . |

*Primary Examiner*—Eugene R. LaRoche
*Assistant Examiner*—Christopher Glembock
*Attorney, Agent, or Firm*—Fay, Sharpe, Beall, Fagan, Minnich & McKee

[57] ABSTRACT

A novel apparatus for handling sheets of paper is disclosed, in which a plurality of transaction medium processing sections are provided as corresponding to a plurality of transaction ports operated by the customer or the teller. When transactions are proceeeding simultaneously at the transaction ports, the operations of the transaction medium processing sections are controlled at the same time. Also, the operations of a plurality of carriers disposed between the transaction ports and a counter and between the counter and an accommodation section for transporting sheets of paper are controlled at a time independently of each other, thereby saving the transaction time. Simultaneous transactions conducted at the transaction ports in this configuration makes it possible to shorten the time of processing each transaction.

12 Claims, 12 Drawing Sheets

APPARTUS FOR HANDLING SHEETS OF PAPER USING ROBOT HANDS

BACKGROUND OF THE INVENTION

The present invention relates to an apparatus for handling sheets of paper for automatic cash deposition and withdrawal.

Generally, an apparatus for handling sheets of paper (automatic teller machine) of this type is installed for direct operation by a customer inside or outside an outlet of a financial institution such as a bank or operated by the teller at the window. Such machine is exclusively used by the customer or the teller respectively and therefore occupies a large floor space and is high in cost. In order to improve this situation, an automatic teller machine has been developed which has a plurality of transaction ports and is produced at a reduced cost. This type of machine is disclosed in JP-A-59-27385, JP-A-59-119497, JP-A-63-188289 and JP-A-59-197990, of which the one disclosed in JP-A-59-197990 is installed on the bank counter.

This conventional machine, however, fails to take into full consideration the shortening of the time of two transactions which may be simultaneously conducted in a plurality of transaction ports. Specifically, when a plurality of transaction ports are engaged in different types of transactions, or the same types of transactions such as depositions or withdrawals, one may be processing a transaction while the other remains out of operation so that the user of the particular transaction port has to wait until the completion of the transaction at the other port. As a result, the services to the users are deteriorated and the provision of a plurality of transaction ports on each machine is substantially meaningless.

Also, in spite of the difference in the nature of the work handled by the teller and the customer, the apparatus has a common operating section for the transaction ports, thus lacking due consideration of the user not accustomed to handling the machine or the refilling of notes. More specifically, the machine disclosed in JP-A-59-27385 or JP-A-59-119497 requires a refilling cassette to be prepared or the cassette in the apparatus to be refilled with notes in case of shortage of notes while the machine is not in operation. If the frequency of refilling notes is to be reduced, a large-sized cassette for accommodating notes is required, thus making the whole machine inconveniently bulky. Further, the refilling of notes requires an exclusive route and mechanism, which complicates the construction, thereby leading not only to a higher cost but also to a lower reliability.

In the machine disclosed in JP-A-59-197990, on the other hand, a user is unable to occupy the operating section (transaction ports) exclusively. The transaction operations cannot be performed at one place.

Furthermore, the machines in the related art have to be redesigned considerably in case of repositioning of the operating section or changing the number of component units to meet the customer needs. Since notes are carried by being held in belts, for example, it is difficult to modify the package and the machine has a smaller scope of meeting different requirements of installation on the counter of in-house lobby, teller-side place or the style of installation on front and rear sides. The unavoidable result is the operation limited on one side or on the opposite sides, thus rendering the machine fail to keep abreast with the ever-multiplying present-day demands.

SUMMARY OF THE INVENTION

Accordingly, it is an object of the present invention to provide an apparatus for handling sheets of paper capable of processing two types of transactions such as depositions or withdrawals at the same time with a short waiting time.

Another object of the present invention is to provide an apparatus for handling sheets of paper capable of refilling notes from a plurality of deposition or withdrawal ports without a refilling cassette or mechanism.

Still another object of the present invention is to provide an apparatus for handling sheets of paper in units intended to meet a variety of needs by combining modules in different numbers or positions as desired thereby to enable mode selection or change by a single switch to satisfy multiple job requirements including window processings such as money transfer, deposition and withdrawal.

In order to realize the simultaneous transactions to overcome the problems first above mentioned, a plurality of transaction ports or an operating section is provided with a plurality of corresponding transaction medium processing sections, with a control section to minimize the time of moving carriers in predetermined sequence. Also, there are provided at least two carriers, one exclusively used for deposition and the other for withdrawal, each having an exclusive transaction port. This construction eliminates the waiting time at the time of accrual of simultaneous transactions and shortens the processing time at the same time.

Also, in order to eliminate the note-refilling mechanism or cassette, a transaction port section and an operating section are provided separately from those for customer use, so that a note shortage which may be detected by a sensor or the like is notified by a small-remainder alarm on the operating section on the teller side. The teller thus switches to the refilling mode to refill notes from the deposition-withdrawal port while being released from the transaction business. A problem which may be encountered when incoming customers are too many with notes likely to be depleted before being refilled, is solved by a selectivity of setting to a desired position of detection of the remaining notes. In order to provide an apparatus for handling sheets of paper meeting the multiple needs of the day, on the other hand, independent mechanisms of an apparatus for handling sheets of paper including a counter section, a carrier, a transaction medium (card or passbook) processing section, transaction ports, a coin processing section, an accommodation section and a control section are constructed in units. This enables the component units including the deposition and withdrawal ports, the card/passbook processing section and the carrier to be freely modified in the number or packaging position in accordance with the place of installation. Further, window jobs and customer transactions are set by the control section in advance to offer free selection at the operating section to meet the customer needs.

The above-mentioned objects are achieved by a plurality of transaction ports, a section for processing transaction media such as card and passbook corresponding to the transaction ports, a counter section for calculating sheets of paper, an accommodation section for accommodating sheets of paper, carrier means for transporting the sheets of paper between the transaction ports and the counter section or between the counter section and the accommodation section in accordance with the transaction sections, and control means for controlling the operation corresponding to each section. The carrier means may be in plural numbers or at least one set thereof corresponding to a plurality of deposition/withdrawal ports is so constructed to carry sheets of paper along a predetermined track. The carrier means may be constructed exclusively for deposition or withdrawal, for concurrent or exclusive use for transaction ports, for concurrent use for deposition/-withdrawal, or exclusively for both the transaction ports and deposition/withdrawal. The carrier means preferably includes a manipulator (robot hands) for holding a plurality of types of bank notes (sheets of paper) at a time. Also, an operating section is provided for performing input operation in each transaction port thereby to permit refilling of notes from each transaction port.

In case of shortage of notes (sheets of paper) in the apparatus, a sensor in the accommodation section is energized to transmit the necessity of refilling notes to the teller or an alarm unit. The teller switches to the refilling mode to refill notes by way of his exclusive transaction port. Notes may be refilled once or as many times as refillable until energization of a sensor in the accommodation section. The notes thus inserted from the transaction port are held by the robot hands of the carrier and transported to the counter, and after being counted, are loaded in the cassette to complete the refilling process.

If the essential parts of an automatic teller machine have independent functions comprising a counter, a carrier with a robot hand for holding notes and freely movable along X, Y and Z axes, a card/passbook processing section, a transaction port section, a passbook printer section, a coin processing section, an accommodator (cassette), an operating section, a control section and the like, and these component parts are appropriately combined in units and packaged in accordance with the objects to be achieved to meet the customer demands, then it is possible to set the performance, cost and size of the apparatus freely.

Also, various jobs utilizing ATM (AUTOAMTIC TELLER MACHINE) including the window processing and customer transactions may be set in advance in a control section in accordance with the customer needs, so that a plurality of operating sections may be switched freely by means of a change-over switch or the like in order to maximize the utility of the functions of the units incorporated in the machine. In the case of simultaneous transactions, on the other hand, the machine comprises as many card/passbook processing sections as the operating sections, thus eliminating the waiting time. At the same time, the moving position of the carrier hands is set as desired by the control section beforehand to minimize the setting time. There may be provided at least two or more carriers to divide the carrier hand functions for exclusive use of deposition and withdrawal. Further, each transaction port may be associated with a carrier for simultaneous parallel transactions to shorten the transaction time. The note counter, which is included in the machine together with the cassette, is high in cost and therefore may be shared by a plurality of transactions for achieving the objects of the invention with equal effect. This also applies to the cassette.

Further, the control section may be constructed for input operation from either teller or customer by means of a change-over switch to attend a physically-handicapped or aged person who is unaccustomed to the machine operation. In that case, the operation of the machine may be suspended and the teller may alternatively process the custoemr functions to serve the customer.

DESCRIPTION OF THE PREFERRED EMBODIMENTS

Figure 1:
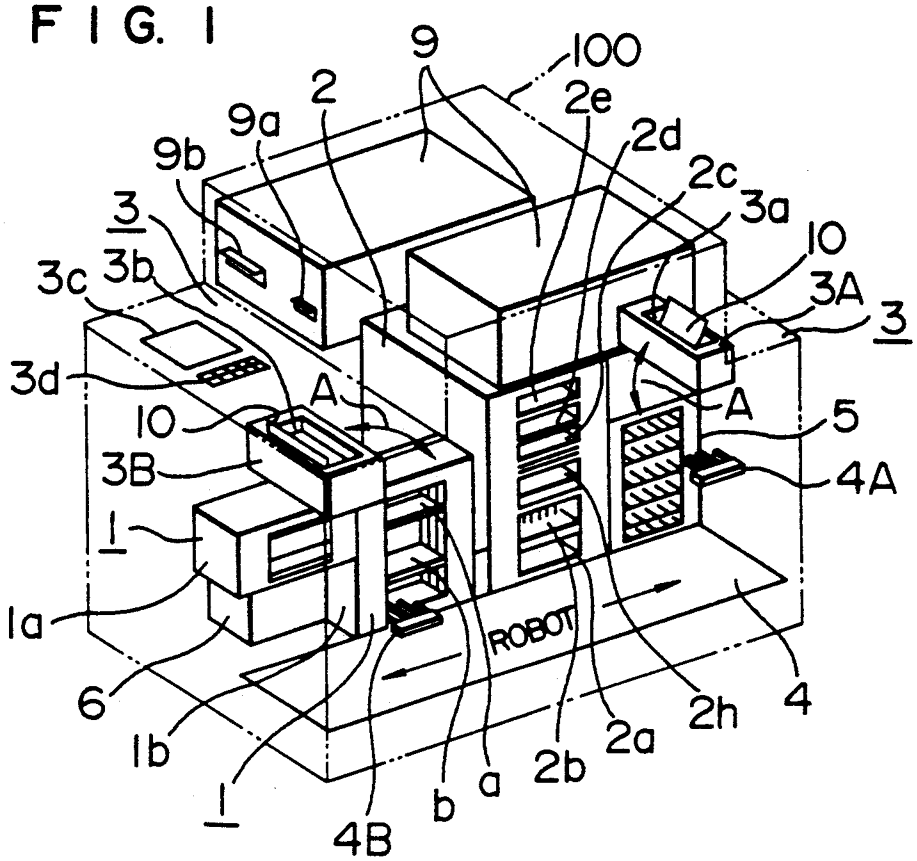
FIG. 1 is a perspective view showing an internal construction of an automatic teller machine according to an embodiment of the present invention.

As shown in FIG. 1, an automatic teller machine (automatic cash handling machine) 100 comprises a transaction port section having independent transaction ports (deposition/withdrawal units) 3A, 3B on the front and rear sides respectively, a counter (counter unit) 2, an accommodation section (accommodation unit) 1, carrier means (carrier) 4, a transaction medium processing section (card/passbook processing unit) 9 for reading and writing a magnetic card and printing a voucher and passbook, a safe 5 disposed separately from the accommodation unit 1, and a control section 6 for controlling the operation of the respective component parts.

The transaction port functions as a dispensation port for a cash dispenser and a deposition/withdrawal port in the case of a cash deposition/dispensation machine. The operating section 3 with a transaction port has arranged thereon a display CRT 3*c* and operating keys 3*d*, with the card loading port 9*a* and the passbook loading port 9*b* of the transaction medium processing section 9 open thereto.

The deposition/withdrawal unit 3A on customer side has an opening for depositing a note 10 in a depositing transaction and a hopper 3*a* directed upward for facilitating the receipt of the note 10 withdrawn. The unit 3A is arranged rotatably along direction A indicated by arrow on the upper front of the apparatus 100. The deposition/withdrawal unit 3B on teller side, on the other hand, has exactly the same function at a position opposite to the customer-side deposition/withdrawal unit 3A. The deposition and withdrawal are thus possible from teller side by use of the deposition/withdrawal unit 3B.

The counter unit 2, which is configured to check and count bank notes in a transaction, is arranged in parallel to the deposition/withdrawal units 3A, 3B.

The counter unit 2 includes pull-in hoppers 2*a*, 2*b* for pulling in the note 10 transported for transaction, a main passage 2*f* for transporting the note 10 thus pulled in, an identifier 2*g* for identifying the note 10 as it passes the main passage 2*f*, and post-check hoppers 2*c*, 2*d*, 2*e* for classifying and holding by class each note 10 thus identified.

The pull-in hoppers 2*a*, 2*b* are adapted to pull in the ten-thousand yen note, the five-thousand yen note and the one-thousand yen note in withdrawal and all classes of notes in depositing transaction, by way of one of the hoppers. The identifier 2*g* detects the class of the note 10 and whether it is genuine or not as it passes the main passage 2*f*, while at the same time checking the note 10 for spoilage or the like to sort a plurality of notes 10 into those usable and those not usable for transactions. The post-check hoppers 2*e* and 2*d* hold ten-thousand yen notes, five-thousand yen notes and one-thousand yen notes in stacks by denomination and the hopper 2*c* false and unusable notes in a stack, in the depositing transaction. The post-check hopper 2*e*, on the other hand, holds notes 10 of all denominations in lump in the withdrawal transaction. In FIG. 1, the accommodation unit 1 has an operation storage 1*b* and a collection storage 1*a*. The operation storage 1*b*, having accommodation hoppers a and b for accommodating notes by denomination, is arranged horizontally in parallel to the counter unit 2.

The accommodation hopper a accommodates one-thousand yen notes to be used in the withdrawal transaction, and the hopper b ten-thousand yen notes used for withdrawal and those deposited. These notes are stacked in the hoppers a and b in that order in the accommodation unit 1. The collection storage 1*a* is for collecting and storing one-thousand yen notes and five-thousand yen notes deposited together with defaced, spoiled or otherwise unusable notes.

Figure 2:
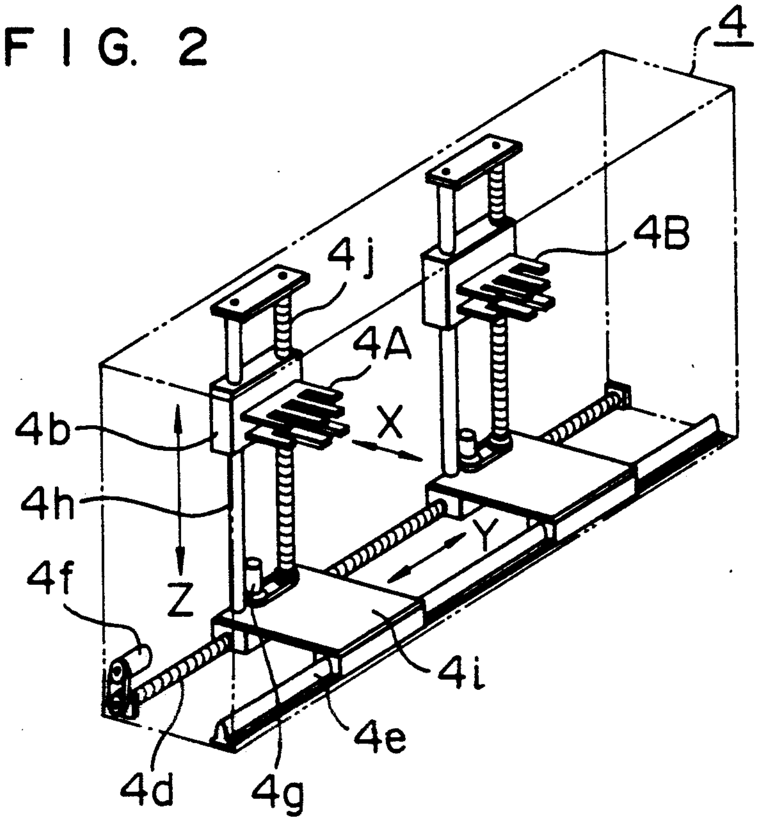
FIG. 2 is a perspective view for explaining the construction of a carrier.
Figure 3:
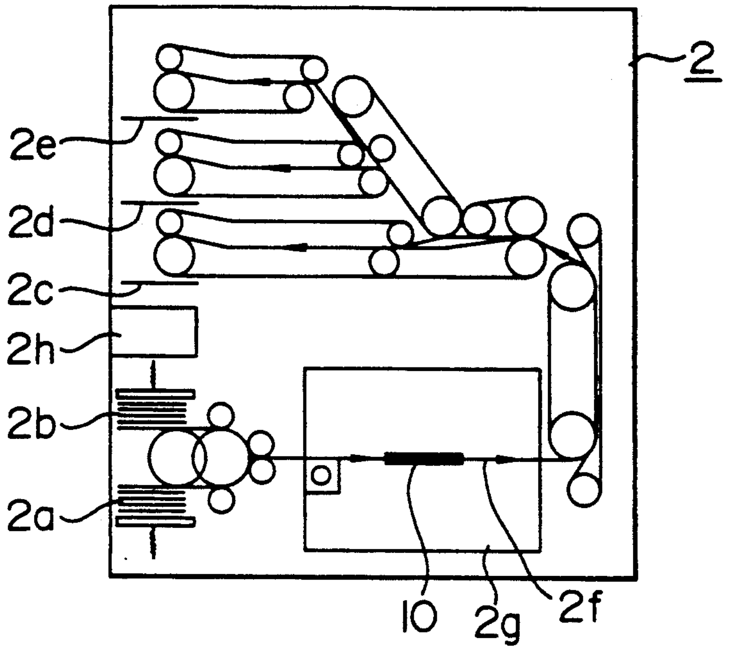
FIG. 3 is a perspective view for explaining the construction of a counter unit.

The carrier 4 includes, as shown in FIG. 2, a robot hand 4A for holding the notes collectively, and an energy source for moving the hand 4A between the deposition/withdrawal units 3A, 3B, the counter unit 2 and the accommodation unit 1 for transporting the notes 10 to each part in accordance with the denomination of money handled in a given transaction. The hand 4B has exactly the same function as the hand 4A. The hand 4A has a pair of openable fingers mounted on a drive member 4*b* movable along the direction of arrow X. The drive member 4*b* is mounted movably in the direction of arrow Z by a motor 4*g* along a fixed track (guide shaft) 4*h* and a screw shaft 4*j*. The guide shaft 4*h* and the screw shaft 4*d* are fixed on a base 4*i*, which is fixed on the screw shaft 4*d* and the track (guide shaft) 4*e* and is thus movable along direction Y in its entirety by a motor 4*f*. The drive member 4*b* has a driving motor built therein. The hand 4B has the same construction as the aforementioned hands and is movable along directions X, Y and Z with fingers thereof openable.

When the user inserts the card or passbook into the card/passbook processing unit 9 for the depositing transaction, the hand 4A performs a predetermined series of operation by an operating section not shown. When the notes 10 are loaded into the hopper 3*a* of the deposition/withdrawal unit 3A, the hand 4A grabs them collectively from the unit 3A moving in the direction of arrow A, transports them for delivery direct to the pull-in hopper 2*a* of the counter unit 2 which sorts the notes 10 into the post-check hoppers 2*e* and 2*d*. The notes 10 on the post-check hoppers 2*e*, 2*d* are received by the hand 4A and transported for delivery to the corresponding hoppers a and b of the operation storage 1*b* of the accommodation section 1.

In the withdrawal transaction, on the other hand, the user inserts his or her card into the card/passbook processing unit 9, after which a predetermined series of operations is performed by an operating section not shown. With the designation of an amount to be withdrawn at the operating section, the notes 10 are collectively grabbed and taken out by the hand 4A from the hoppers a and b of the operation storage 1*b* of the accommodation section. 1. These notes are transported and delivered to the pull-in hoppers 2*a* and 2*b* corresponding to the counter unit 2. The counter unit 2 sends out the notes of such classes in such number as designated colelctively to the post-check hopper 2*e*. The notes thus sent out are transported and delivered to the hopper 3*a* of deposition/withdrawal unit 3A by the hand 4A. In the process, in order to save the time of the depositing transaction, the hand 4A transports the notes from the hoppers b, a of the operation storage 1*b* of the accommodation unit 1 to the pull-in hoppers 2*a*, 2*b* of the counter unit 2 in advance. The notes 10, if any, in the pull-in hopper 2*b* are temporarily returned to the hopper 2*h* of the counter unit 2 in each depositing transaction.

The hand 4B is also capable of receiving notes 10 from and delivering them to the deposition/withdrawal unit 3A, 3B, the counter unit 2 and the accommodation storage 1. The provision of two hands 4A and 4B and two card/passbook processing units 9 is for making possible simultaneous transactions.

Figure 4:
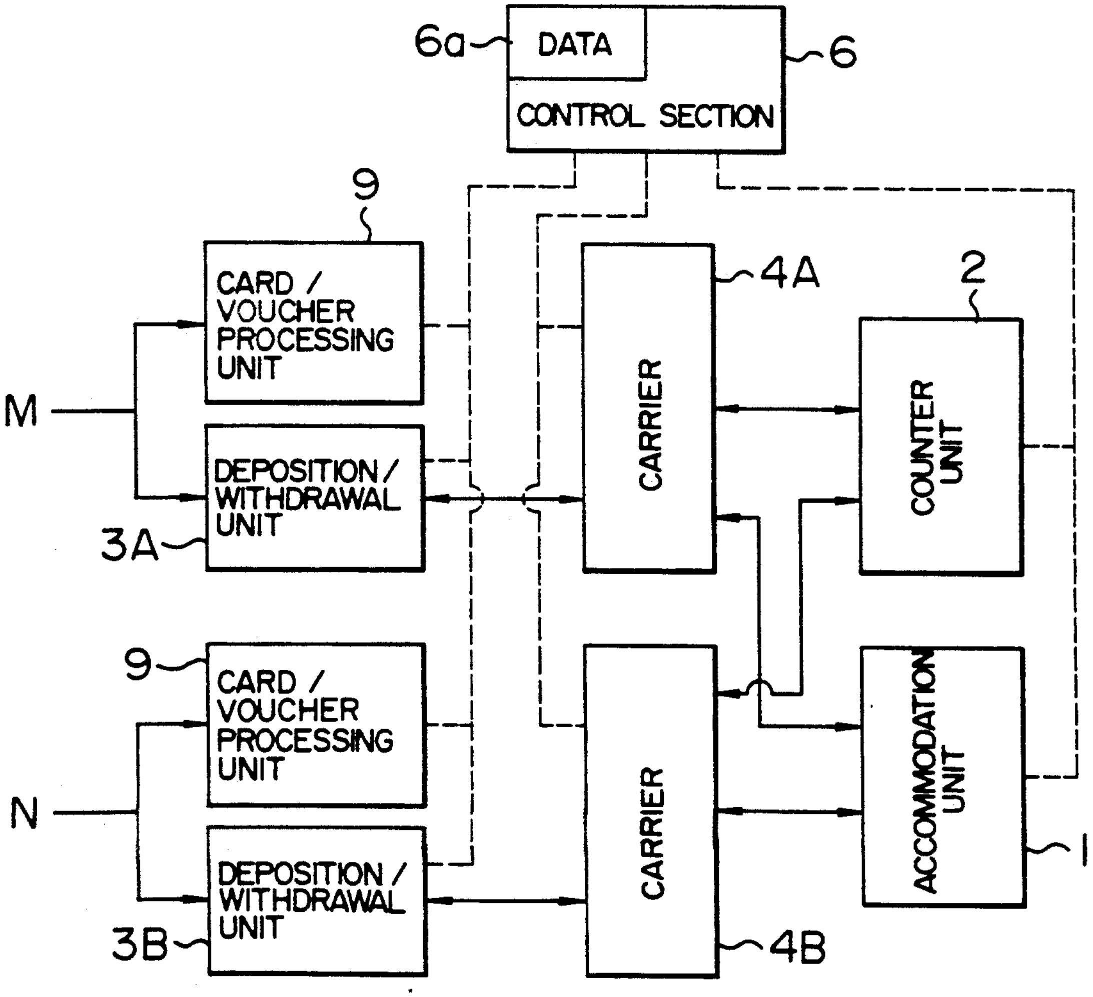
FIG. 4 is a block diagram of the whole machine according to the present invention.

The control section 6, as shown in FIG. 4, has data and operation patterns stored in a memory 6*a* for controlling the operation of each part of the machine, while also setting the range of operation of the carrier 4.

The automatic teller machine according to the present invention may be operated by any of various user couples including customer with customer, teller with customer or teller with teller. In the customer-customer combination, for example, one side of the machine may be used for deposition/withdrawal in normal transactions, and the other for credit transactions as well as cash dispensation and repayment. These operations may be switched at a touch by a change-over switch not shown in the machine. When the customer uses the machine with the teller, on the other hand, the teller may conduct the transfer job not accompanied by any deposition or withdrawal, or use the machine for window processings such as tax payment. In this way, the internal functions of the machine are expandable to maximum advantage. Further, if the functions of the operating section on teller side are rendered identical to those of the operating section on customer side, a customer unaccustomed to the machine may be attained by the teller operating the machine for the customer by the change-over switch without relocating himself to the customer side. Only a few examples are mentioned above, and if job programs are stored in the memory 6*a* of the control section 6 in advance, a great variety of customer needs are met readily.

The operation of the automatic cash handling machine for simultaneous transactions will be explained. As described above, the operation of simutlaneous transactions is performed by two card/passbook processing units 9, two deposition/withdrawal units 3A, 3B and two carriers 4A, 4B. A block diagram of such a configuration is shown in FIG. 4. Characters M and N designate users, who directly operate the card/passbook processing unit 9 and the deposition/withdrawal units 3A, 3B. Solid arrows around the carriers 4A, 4B designate the routes by way of which the carriers 4A, 4B access the units with notes as a medium, while the dashed arrows indicate the routes by way of which the control section 6 accesses the units. The carriers 4A, 4B correspond selectively to the counter unit 2 and the accommodation unit 1. These carriers may be operated for use exclusive to specific transactions of deposition or withdrawal but for both deposition/withdrawal units 3A and 3B at the same time, or for two transactions of deposition/withdrawal but exclusive to each unit 3A, 3B, or exclusive both to a specific transaction and to each unit 3A, 3B. These modes are all controlled for operation by a command from the control section 6.

Figure 6:
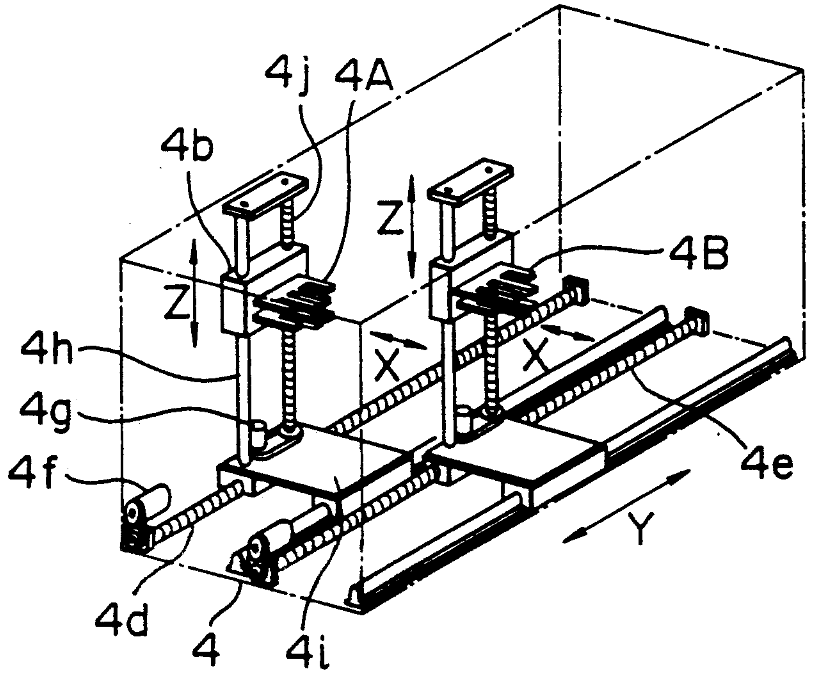

A configuration of an automatic cash handling machine according to the present invention has been described above. In the case of FIG. 4, the carrier 4A may be used exclusively to the customer side M and the other carrier 4B for exclusive use of the customer side N. In such a case, the carrier means 4 is configured as shown in FIG. 2. This configuration is advantageous when the number of transactions is divided substantially equally between the deposition/withdrawal units 3A and 3A. Although the aforementioned configuration is employed in this embodiment, the hand 4B may be used for deposition and the other hand 4A for withdrawal exclusively. In such a case, the block diagram is the same as FIG. 4, but the carrier means 4 has a configuration shown in FIG. 6. The feature of this configuration lies in that the two hands 4A and 4B are movable along the arrow Y on different tracks. The stroke of the hand 4A along arrow X is of course longer than that of the hand 4B in this configuration. This configuration is advantageous in the case where the numbers of depositions and withdrawals are equally divided. Apart from this configuration exclusively used for deposition and withdrawal, a completely different configuration may comprise a control section 6 for instantaneously detecting a position of the hand at such a position nearest to the deposition/withdrawal units 3A, 3B or the counter unit 2 as effective to shorten the transaction time. This is also the case with FIG. 2.

Figure 5:
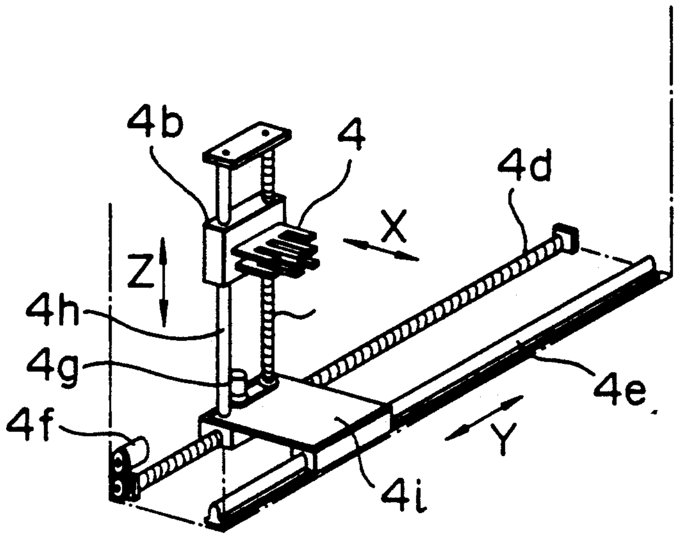
FIGS. 5 and 6 are diagrams showing constructions of the carrier according to other embodiments of the present invention.
Figure 7:
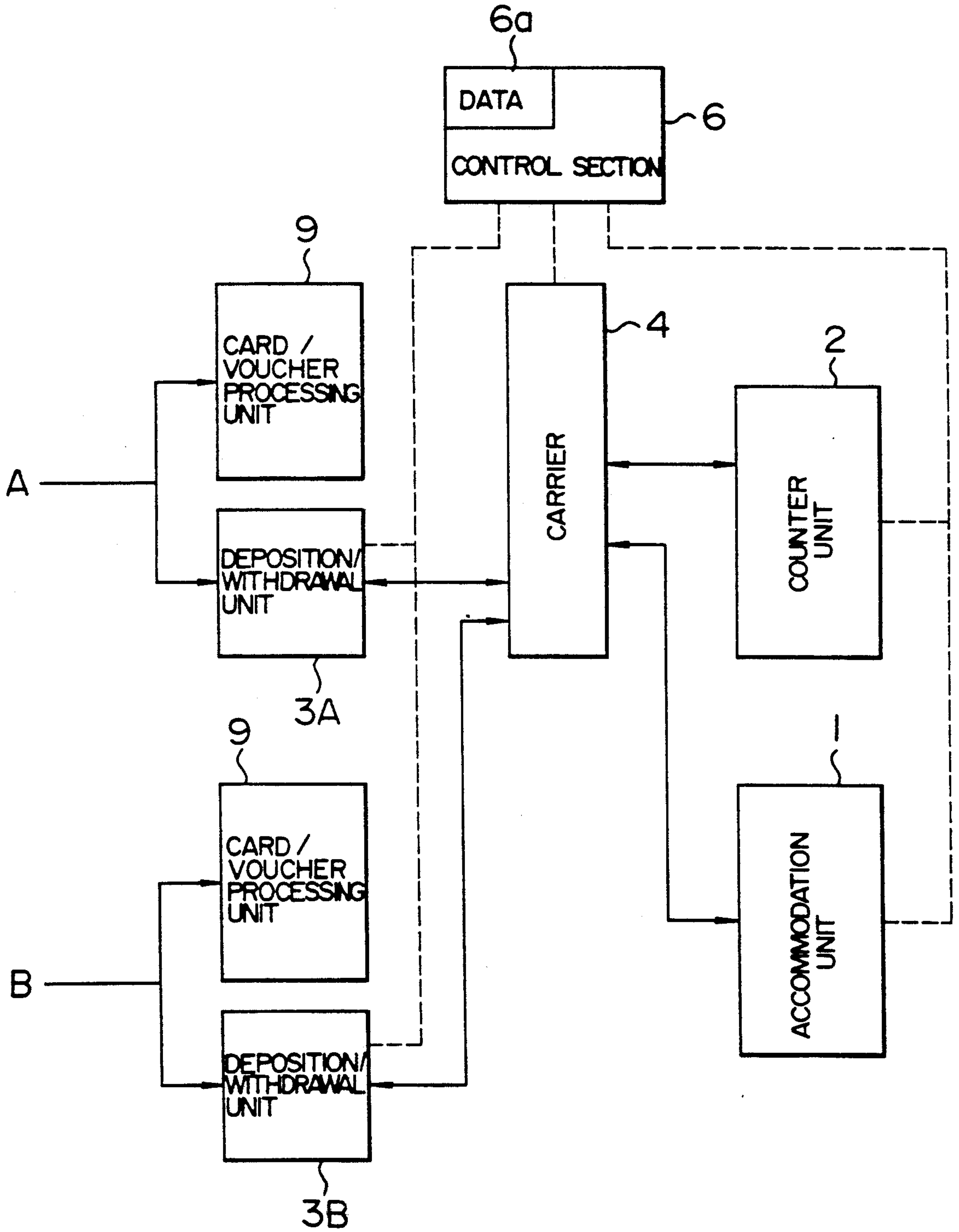
FIG. 7 is a block diagram showing the whole machine according to still another embodiment of the present invention.

Still another embodiment is shown in the block diagram of FIG. 5 representing a configuration of a smaller scale in which only one set of hands 4 serves the purpose although the waiting time on one side may be a littler longer than in the previous embodiment. A block diagram of this configuration is shown in FIG. 7. As in FIG. 4, characters M, N designate users, the solid arrow a route for the carriers 4A, 4B to access each unit through notes, and the dashed arrow a route for the control section 6 to access each unit.

The aforementioned configuration of the carrier means 4 is only an example. Alternatively, the transportation track may be configured in arcuate form along which the other units may be arranged with an ATM mounted on a circular table. The units may also be combined in numerous other configurations.

Figure 8:
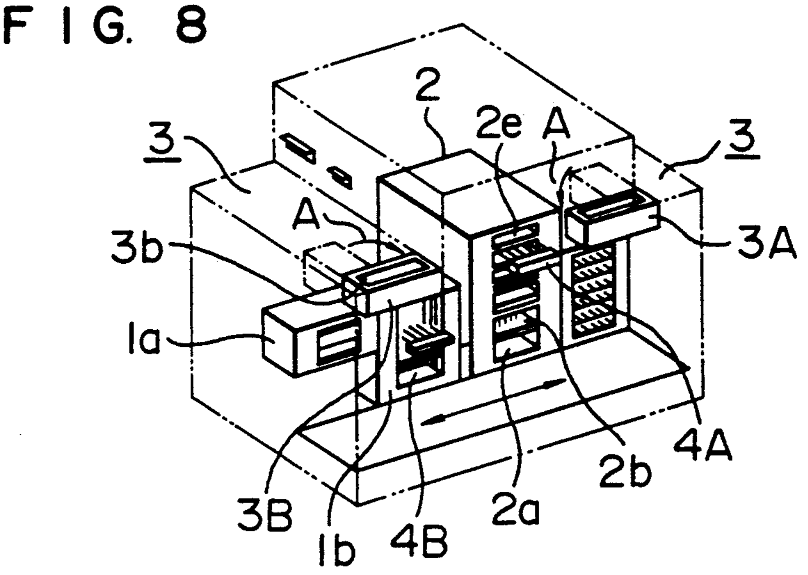
FIGS. 8 to 12 are diagrams for explaining the operation of the machine shown in FIG. 1.
Figure 9:
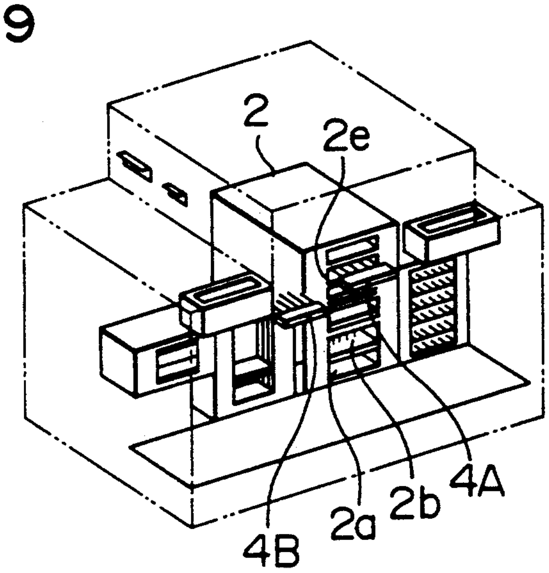
Figure 10:
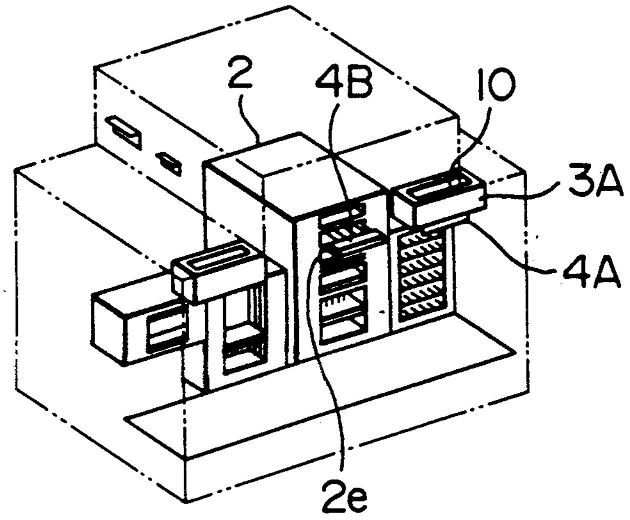
Figure 11:
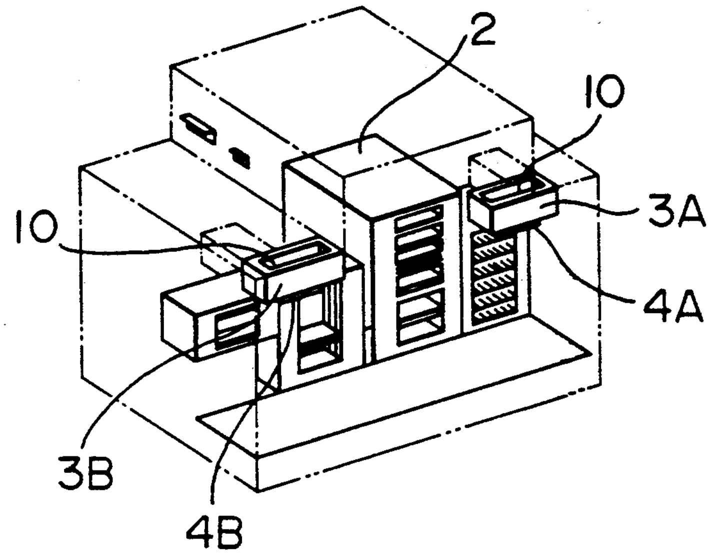
Figure 12:
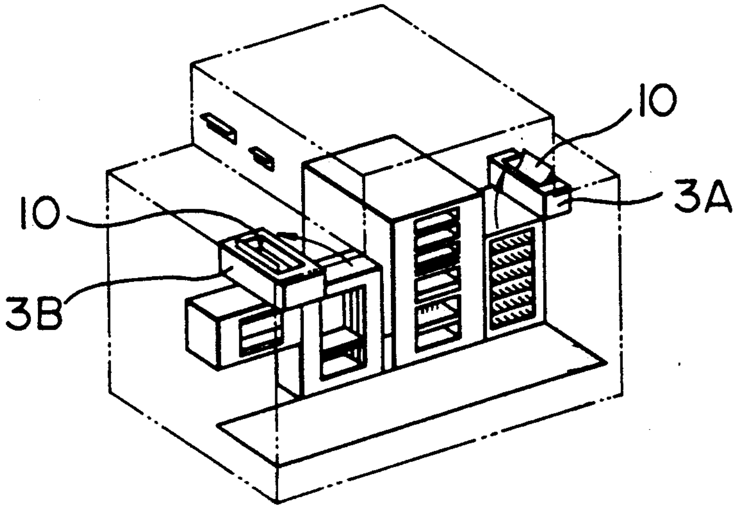

The operation of simultaneous withdrawal transactions will be explained with reference to FIG. 8. The specific processes of withdrawal for the hand 4B are similar to those explained above for the hand 4A. The users M and N operate the keys on the operating section not shown and process their magnetic cards concurrently. The hand 4B proceeds to fetch withdrawal notes from the operation storage 1*b*, and inserts one-thousand yen notes and ten-thousand yen notes in a stack into the pull-in hoppers 2*a*, 2*d* of the counter unit 2. This inserting operation may be alternatively implemented beforehand. In the process, the hand 4A stands by before the post-check hopper 2*e* of the counter unit 2. The deposition/withdrawal units 3A, 3B rotate in the direction of arrow A and also stand by at a position ready to receive the notes from the hands 4A, 4B. Then, as shown in FIG. 9, the notes on M side are sent out by the counter unit 2 and stacked in the hopper 2*e*. In the mean time, the hand 4B stands by. As the next step, as shown in FIG. 10, the hand 4A pulls out the note 10 and delivers it to the deposition/withdrawal unit 3A. At the same time, the hand 4B receives the withdrawal note 10 on N side in front of the hopper 2*e* of the counter unit 2. After receiving the note in this way, the hand 4B delivers the note 10 to the deposition/withdrawal unit 3B. Then, as shown in FIG. 12, the deposition/withdrawal units 3A, 3B rotate to deliver the withdrawal note 10 to the user.

This is also the case with the deposition process, in which a note is sent out from the counter unit 2 with a waiting time accruing of one pair of hands only at the time of checking. The processes of the depositing operation will not be explained.

Figure 13:
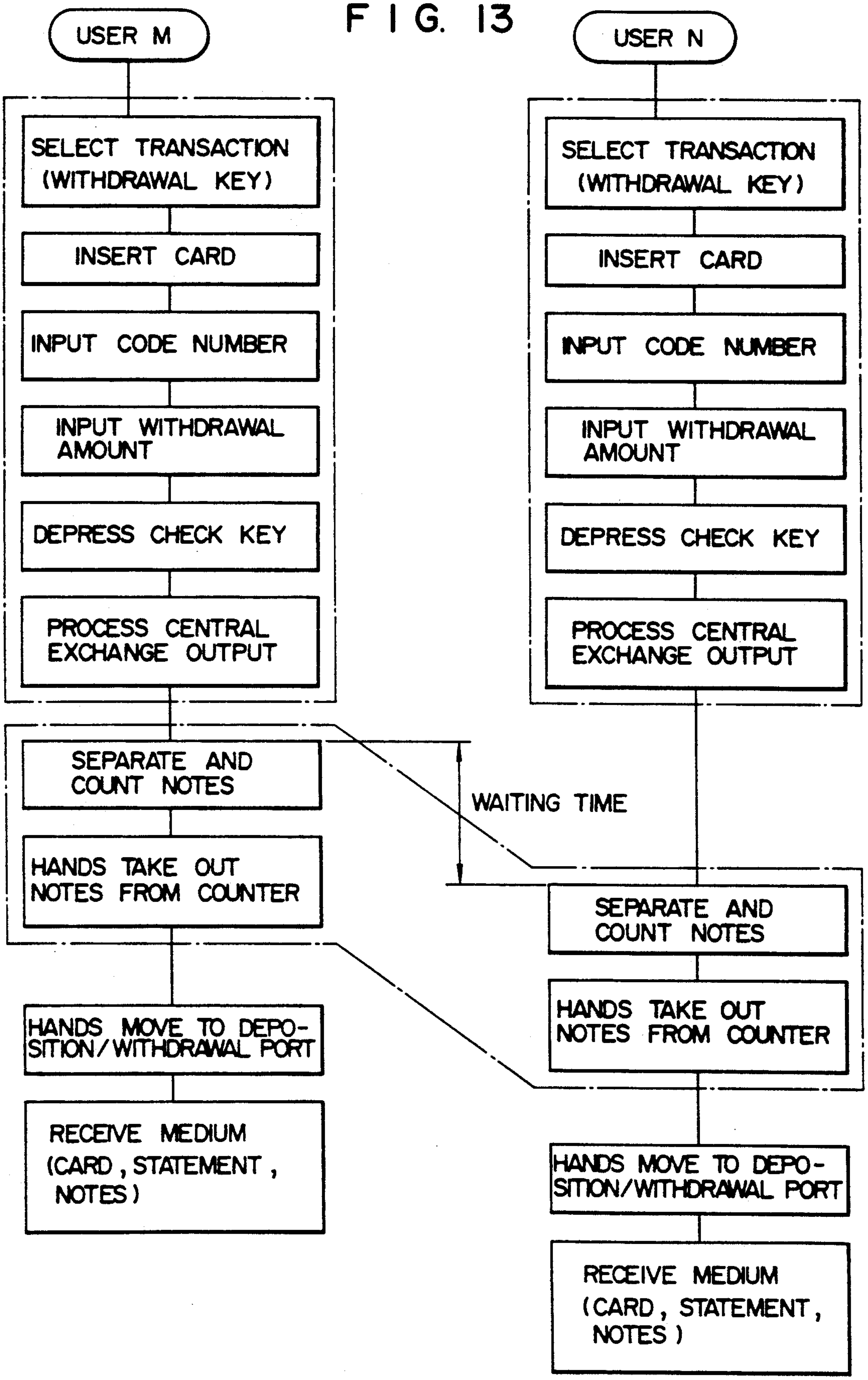
FIG. 13 shows a flow of operation of simultaneous transaction of withdrawals.

A flow of withdrawal operation for simultaneous transactions described above is shown in FIG. 13. With time plotted along the ordinate, the users M and N may use the machine at the same time in all the processes from selection of a transaction to central exchange. The counter unit which is high in cost and shared by the users stands by for counting notes on one side only when counting notes on the other side, but is configured to begin to count the notes on one side immediately after the counting of the notes on the other side is finished. The time lengths required for the processes for M and N have therefore only a small difference equivalent to the time of counting notes. Only a small time gap therefore occurs between M and N sides while the key operations, card processings, transportations of notes, etc. are carried out in parallel.

Figure 14:
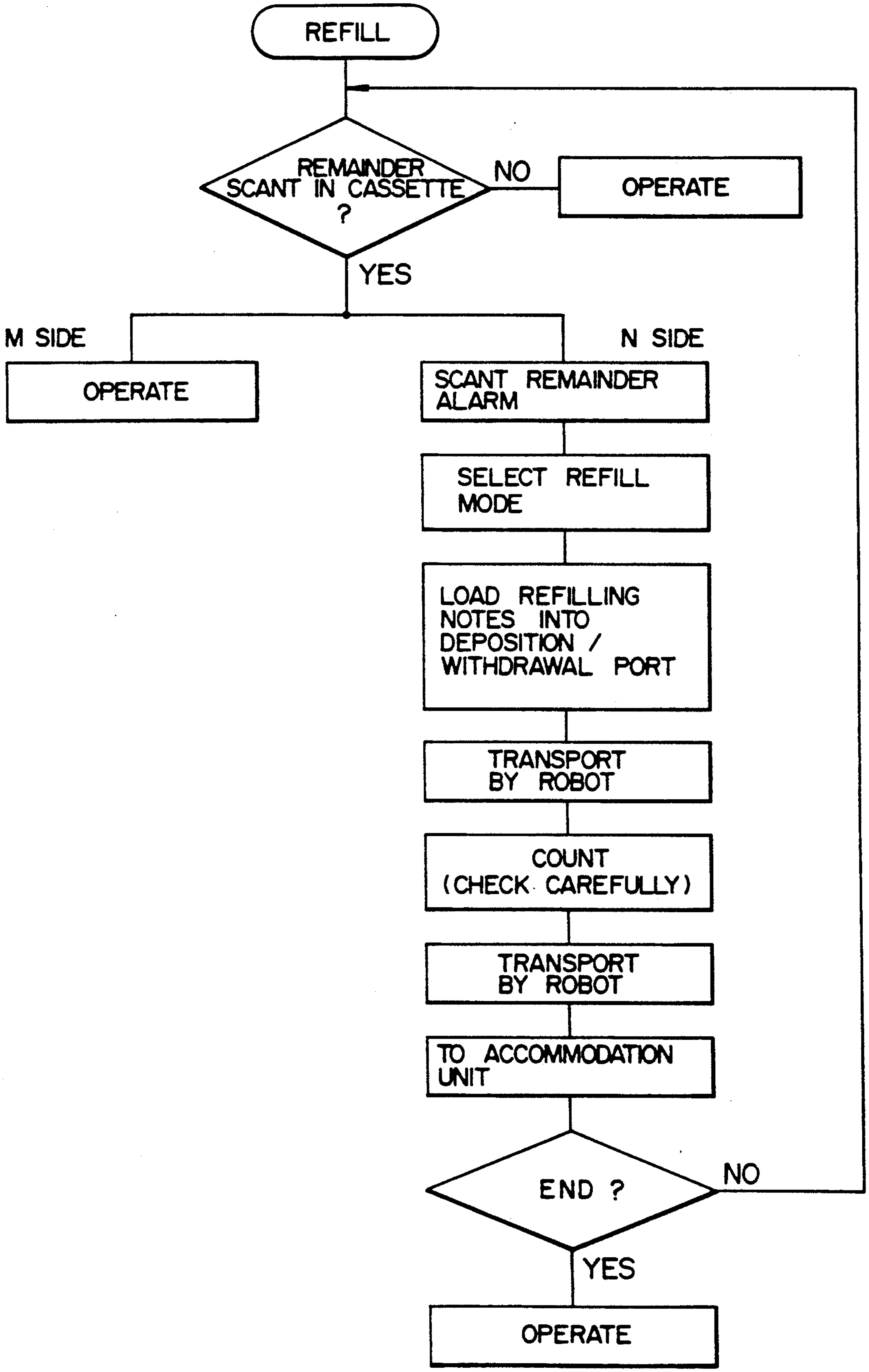
FIG. 14 shows a flow of note-refilling operations.

Also, by use of the automatic cash handling machine according to the present invention, notes are easily refilled as shown by the flow of operation in FIG. 14. When a sensor not shown detects a shortage of notes by the height of the stack in the operation storage 1*b*, for instance, a small-remained alarm starts in the operating section on the other side. In this case, the alarm is preferably started from the teller side. The teller N then selects the refilling mode by key operation and normally loads supplementary notes by way of the deposition/withdrawal unit 3 used for deposition/withdrawal. The notes thus loaded, as in a normal depositing operation, are inserted by the hands 4 into the hopper 2*a* of the counter unit 2, and are checked before registering the number of refilled notes with the control section 6 of the machine. Then, the hands 4 insert the note 10 to refill into the hopper a or b of the operation storage 1*b*. In the meantime, transactions are available on the other side N through the operating section thereof without suspending the machine operation. Also, one-thousand notes and ten-thousand notes, even if refilled and mingled with each other, pose no problem as they are appropriately classified in the counter unit 2. Further, a great number of notes may be refilled in several lots.

Figure 15:
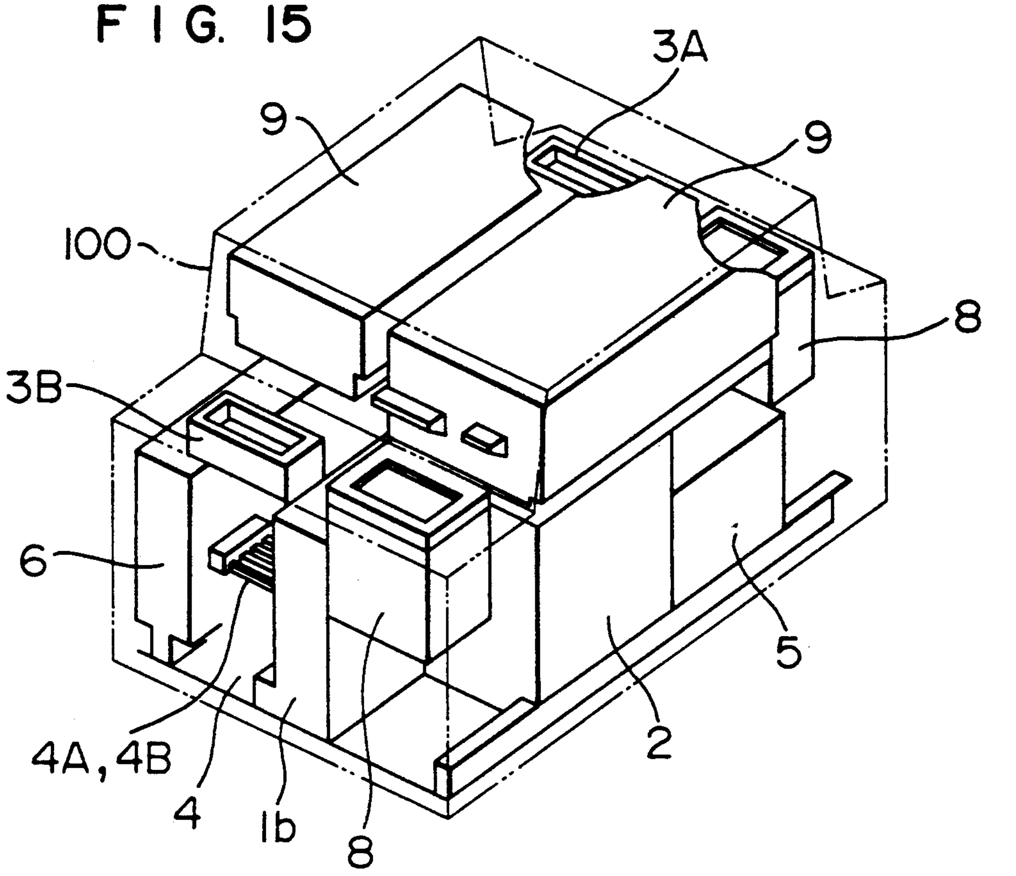
FIG. 15 is a perspective view showing component units according to a further embodiment of the present invention.
Figure 16:
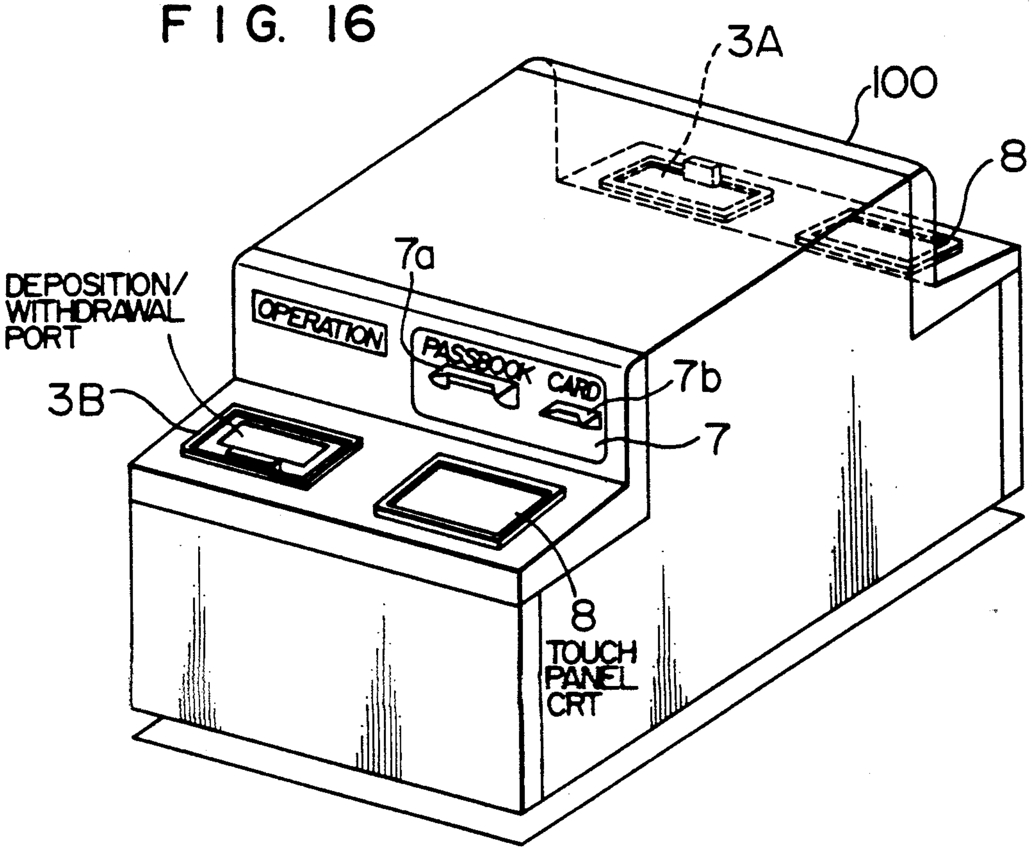
FIG. 16 is a perspective view showing the appearance of the embodiment shown in FIG. 15.
Figure 17:
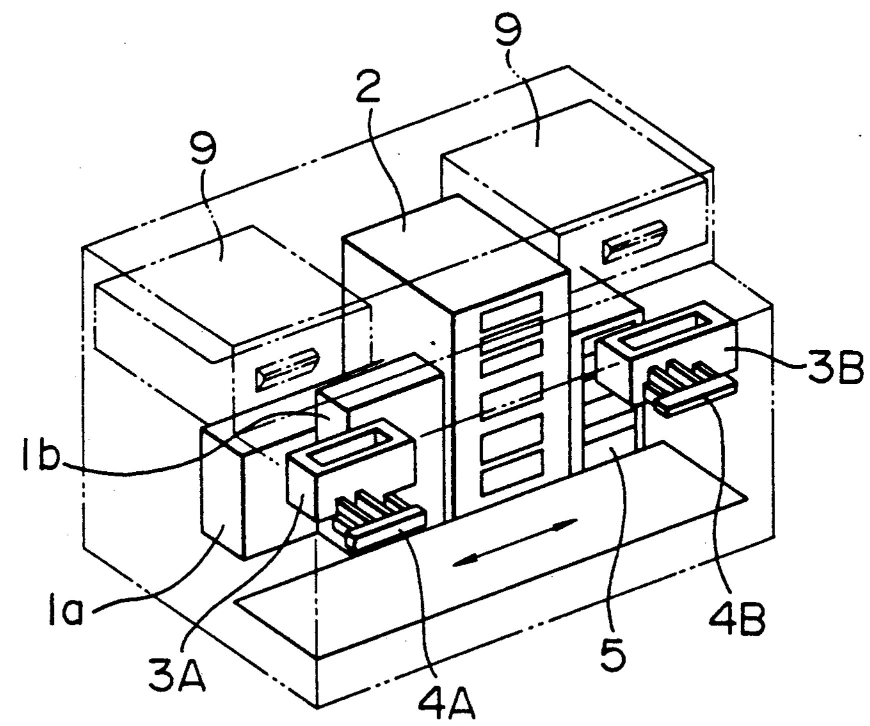
FIGS. 17, 22 and 23 are perspective views of component units according to still other embodiments of the present invention.

FIG. 15 is a diagram showing an embodiment of an automatic cash handling machine according to the present invention. The operating section has deposition/-withdrawal units 3A, 3B, a CRT 8 and a card/passbook processing unit 9 with two hands 4A and 4B of carrier means 4. It includes the carrier means 4 being arranged in opposition to a control section 6, an operation storage 1*b*, a counter unit 2 and a safe 5. All these component parts are constructed in independent units and therefore are freely recombined or changed in number to meet specific customer needs. Also, the operating sections placed in opposition to each other in this embodiment are for the purpose of rendering the amounts handled by the users invisible from each other or in order to place the user and the teller face-to-face to each other. These units, however, may alternatively be arranged in juxtaposition as shown in FIG. 17. The operation of the apparatus with juxtaposed units is similar to that explained above. Instead of two operating sections shown in FIG. 17, a given number of them may be generally arranged. Also, units may be arranged not in alignment but along a curved track of operation of the carrier means 4. FIG. 16 is a perspective view showing the machine of the embodiment of FIG. 15.

The deposition/withdrawal section, the card/passbook processing section, the counter section, the accommodation section, the note carrier means and the control means for respective parts correspond to the deposition/withdrawal unit, the card/passbook processing unit, the counter unit, the accommodation unit, the carrier means and the control section respectively in the aforementioned embodiments.

Figure 18:
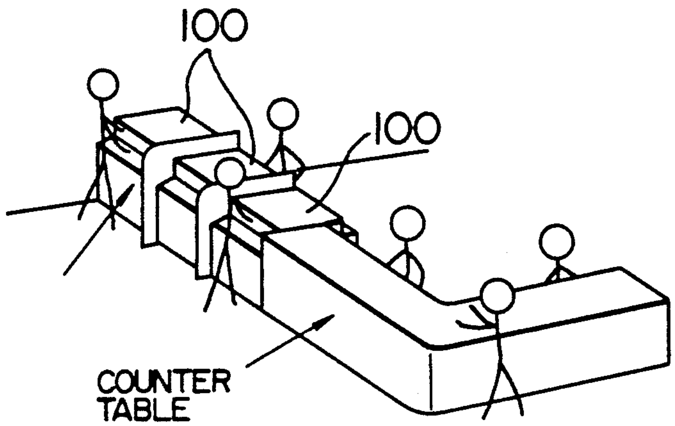
FIGS. 18 to 21 are diagrams showing possible layouts of an automatic teller machine according to the present invention.
Figure 19:
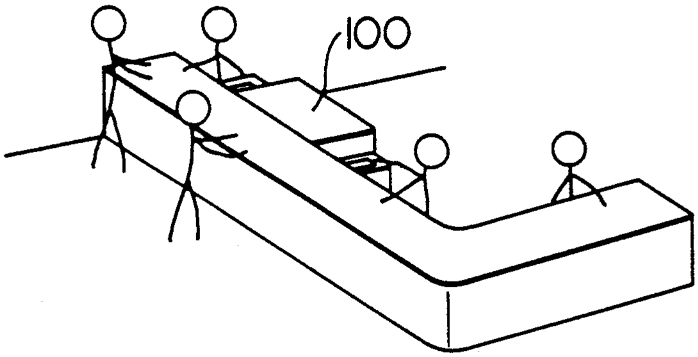
Figure 20:
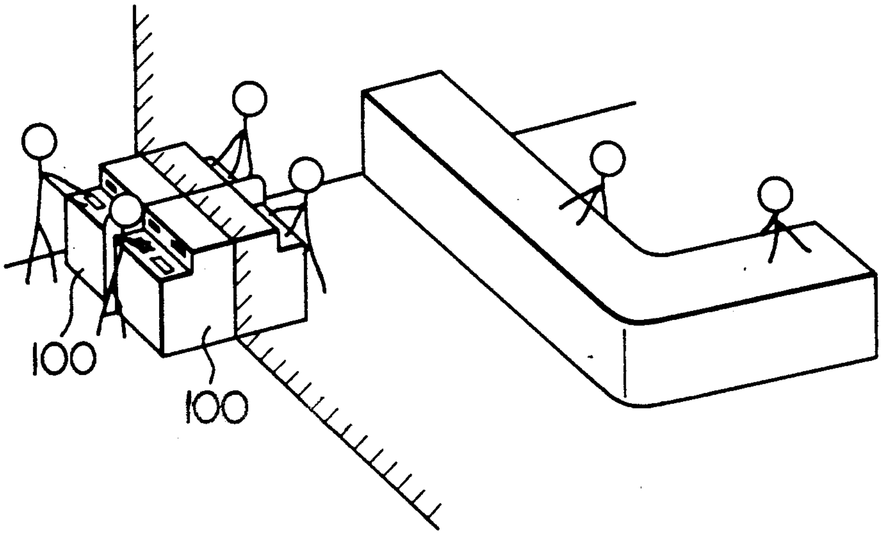

Embodiments of the layout of an automatic teller machine according to the present invention are shown in FIGS. 18 to 20.

Specifically, FIG. 18 illustrates a machine according to the invention arranged on the counter between the teller and the customer. This layout allows transactions to be conducted while the teller is kept in contact with the customer.

FIG. 19 is a diagram showing an embodiment of layout with two tellers attending a machine in opposite positions to each other on the teller side.

FIG. 20 shows an embodiment in which the machine units are arranged on the opposite sides of a partition dividing, for example, a bank office into inner and outer portions. This layout permits customers both inside and outside of a bank office to use the machine at the same time.

Figure 21:
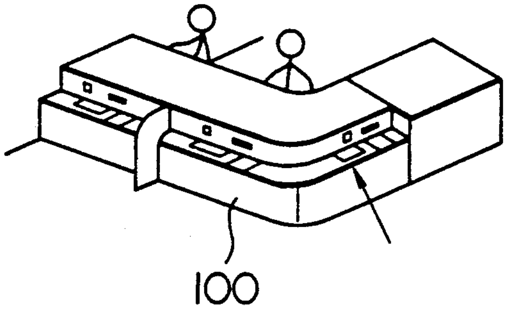

FIG. 21 shows an embodiment of juxtaposed arrangement of units in FIG. 17. This layout has a feature in that a single machine may have a plurality of operating sections at a plurality of points.

Figure 22:
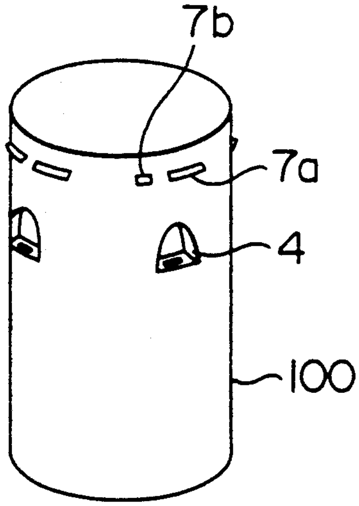

FIG. 22 shows still another embodiment with an operating section contained in a cylindrical member. In this embodiment, the units are arranged in radial fashion with the carrier means 4 accessing each unit while rotating in horizontal direction.

Figure 23:
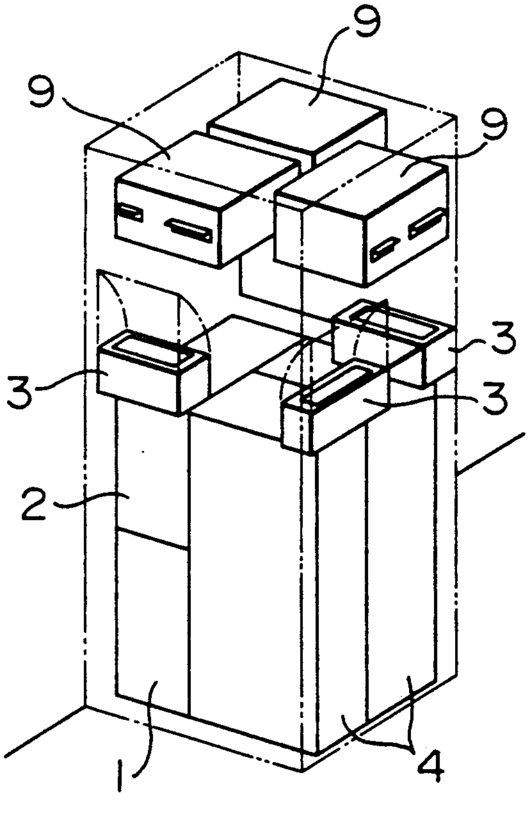

FIG. 23 is a diagram showing an embodiment in which two carrier means 4, three card/passbook processing units 9 and three operating sections are incorporated in a rectangular parallelepiped member. The counter unit 2 and the accommodation storage 1 are shared by different sets.

The embodiments described above is only one of various combinations of the units which may be conceivable with equal effect.

It will thus be understood from the foregoing description of embodiments that units of an automatic teller machine may be freely combined to meet the customer needs with the operating position and quantity of ATM freely set. Also, the fact that the mode of the operating section is changeable at a touch permits a timely setting of the operation meeting the customer needs for an improved work efficiency, while at the same time greatly contributing to the convenience of the customer. It is also possible to reduce the investment amount by decreasing the number of machines by an appropriate combination of units. Further, simultaneous use saves the waiting time of users. This feature, coupled with the availability of a plurality of operating sections in a single machines, gives each machine the capabilities equivalent to several machines, thus reducing the amount of equipment investment. Furthermore, bank notes may be refilled from the deposition/withdrawal unit on teller side, so that the need of a refilling cassette or mechanism is eliminated in case of a shortage of notes. This reduces the note capacity requirement leading to a compact machine.

We claim:

1. An apparatus for handling sheets of paper comprising:

- a plurality of transaction ports for depositing/dispensing sheets of paper for transaction operations;
- a plurality of transaction medium processing sections for receiving a transaction medium corresponding to and used with the transaction ports by an operator at the time of a transaction;
- one counter section for processing and counting sheets of paper received from or delivered to each of said transaction ports in the processing of a transaction;
- an accommodation section for accommodating sheets of paper received from or delivered to said counter section;
- a plurality of carrier means for transporting sheets of paper between the transaction ports and the counter section and between the counter section and the accommodation section; and
- a control section for controlling the transaction operation of each of said sections in response to a transaction operation initiated at one of the transaction ports by the receiving of a transaction medium at the transaction medium processing section corresponding to the one transaction port.

2. An apparatus for handling sheets of paper, comprising:

- a plurality of transaction ports for depositing/dispensing sheets of paper for transaction operations;
- a plurality of transaction medium processing sections for receiving a transaction medium corresponding to and used with the transaction ports by an operator at a time of a transaction;
- one counter section for processing and counting sheets of paper received from or delivered to each of said transaction ports in the processing of a transaction;

an accommodation section for accommodating sheets of paper received from or delivered to said counter section;

a plurality of carrier means, including a plurality of pairs of robot hands for holding and transporting sheets of paper and further including a track for guiding motion of the robot hands between the transaction ports and the counter section, and between the counter section and the accommodation section; and a control section for controlling the transaction operation of each of said sections in response to a transaction operation initiated at one of the transaction ports by the receiving of a transaction medium at the transaction medium processing section corresponding to the one transaction port, wherein the operation of each of said transaction medium processing sections receiving a transaction medium is controlled independently by the control section, and the operation of each of the carrier means is also controlled independently by the control section; and a casing for containing said carrier means and each said section handling sheets of paper.

3. An apparatus for handling sheets of paper according to claim 2, wherein each of said carrier means is operated exclusively and independently in accordance with a specific type of transaction.

4. An apparatus for handling sheets of paper according to claim 2, wherein said carrier means includes means for guiding the movement of each of the robot hands independently along the track.

5. An apparatus for handling sheets of paper according to claim 2, wherein said carrier means includes means for guiding the robot hands at least in a two-dimensional motion along the track.

6. An apparatus for handling sheets of paper according to claim 2, wherein sheets of paper deposited by way of the transaction ports are filled into the accommodation section.

7. An apparatus for handling sheets of paper, comprising:

a plurality of transaction ports for depositing/dispensing sheets of paper for transaction operations;

a plurality of transaction medium processing sections for receiving a transaction medium corresponding to and used with the transaction ports by an operator at the time of a transaction;

one counter section for counting sheets of paper for transactions made in accordance with each of the transaction ports;

an accommodation section or accommodating sheets of paper received from or delivered to said counter section;

a plurality of robot hand sections corresponding to the transaction ports for transporting sheets of paper between the transaction ports and the counter section, and between the counter section and the accommodation section;

a control section for controlling the transaction operation of each of said sections in response to a transaction operation initiated at one of the transaction ports by the receiving of a transaction medium at the transaction medium processing section corresponding to the one transaction port, said control section controlling each of said transaction medium processing sections independently and controlling each of said robot hand sections independently and exclusively in accordance with each of the transaction ports.

8. An apparatus for handling sheets of paper according to claim 7, wherein said robot hand sections include a plurality of pairs of robot hands for holding and transporting sheets of paper and further include a track for guiding the motion of the robot hands.

9. An apparatus for handling sheets of paper according to claim 8, wherein said robot hand sections include a track for guiding each of the robot hands independently.

10. An apparatus for handling sheets of paper according to claim 8, wherein said robot hand sections include a track for guiding the robot hands in at least a two dimensional field of motion.

11. An apparatus for handling sheets of paper according to claim 7, wherein sheets of paper deposited by way of the transaction ports are filled into the accommodation section.

12. An apparatus for handling sheets of paper according to claim 7, wherein only one said accommodation section is commonly employed for the respected independent operations.

* * * * *